(12) United States Patent
Gioioso et al.

(10) Patent No.: US 11,600,155 B2
(45) Date of Patent: Mar. 7, 2023

(54) SENSING DEVICE SUITABLE FOR HAPTIC PERCEPTION APPLICATIONS

(71) Applicant: WEART S.R.L., Milan (IT)

(72) Inventors: Guido Gioioso, Tricarico (IT);
Giovanni Spagnoletti, Molinara (IT);
Domenico Prattichizzo, Siena (IT);
Mirko Aurilio, Grosseto (IT)

(73) Assignee: WEART S.R.L., Milan (IT)

( * ) Notice: Subject to any disclaimer, the term of this patent is extended or adjusted under 35 U.S.C. 154(b) by 0 days.

(21) Appl. No.: 17/309,940

(22) PCT Filed: Dec. 30, 2019

(86) PCT No.: PCT/IB2019/061447
§ 371 (c)(1),
(2) Date: Jul. 1, 2021

(87) PCT Pub. No.: WO2020/141443
PCT Pub. Date: Jul. 9, 2020

(65) Prior Publication Data
US 2022/0075451 A1    Mar. 10, 2022

(30) Foreign Application Priority Data
Jan. 2, 2019  (IT) .................. 102019000000004

(51) Int. Cl.
*G08B 6/00*   (2006.01)
*G06F 3/01*   (2006.01)

(52) U.S. Cl.
CPC ............... *G08B 6/00* (2013.01); *G06F 3/014* (2013.01); *G06F 3/016* (2013.01)

(58) Field of Classification Search
CPC ............ G08B 6/00; G06F 3/014; G06F 3/016
See application file for complete search history.

(56) References Cited

U.S. PATENT DOCUMENTS 10,579,099 B2 *   3/2020   Wang .................. G06F 3/014
2009/0096746 A1   4/2009   Kruse et al.
(Continued)

FOREIGN PATENT DOCUMENTS

WO    WO-2017175868 A1    10/2017
WO    WO-2020141443 A1    7/2020

OTHER PUBLICATIONS

J. M. Romano and K. J. Kuchenbecker, "Methods for robotic tool-mediated haptic surface recognition," 2014 IEEE Haptics Symposium (HAPTICS), 2014, pp. 49-56, doi: 10.1109/HAPTICS.2014.6775432. (Year: 2014).*
Han, T., et al, "Exploring Design Factors for Transforming Passive Vibration Signals into Smartwear Interactions," *NordiCHI '16: Proceedings of the 9th Nordic Conference on Human-Computer Interaction* 35: 1-10, Association for Computing Machinery, United States (Oct. 2016).
(Continued)

*Primary Examiner* — James T Tsai
(74) *Attorney, Agent, or Firm* — Sterne, Kessler, Goldstein & Fox P.L.L.C.

(57) ABSTRACT

This disclosure illustrates a wearable detection device, configured to detect vibrations due to the impact of fingers against an object and/or to the sliding of fingertips on a rough surface thereof. The detection device comprises an elastically deformable annular band defining a lower part, configured to remain exposed and be placed in direct contact with an object to be touched and with a user's finger, and an upper part configured to remain in an internal compartment of the detection device; a rigid support fixed to the upper part of the band and placed outside it; a microprocessor electronic board fixed to the rigid support and having at least one vibration sensor which senses vibrations transmitted to the electronic board; a rigid body comprising a front cover and a rear cover that can be hooked together to define the internal (Continued)

compartment and at least a rigid curved surface configured to be placed in direct contact with the user's finger, in which the front cover and the rear cover, when coupled together, enclose in the internal compartment the upper part of the annular band, the electronic board and the rigid support, the latter remaining in contact with an internal face of the rigid body.

10 Claims, 8 Drawing Sheets

(56) References Cited

U.S. PATENT DOCUMENTS

| | | | | |
|---|---|---|---|---|
| 2009/0278798 | A1* | 11/2009 | Kim | G06F 3/017 |
| | | | | 345/158 |
| 2017/0131772 | A1* | 5/2017 | Choi | G06F 3/041 |
| 2018/0059787 | A1 | 3/2018 | Keller et al. | |
| 2018/0120936 | A1* | 5/2018 | Keller | G06F 3/0304 |
| 2019/0324536 | A1* | 10/2019 | Forest | G06F 3/016 |
| 2020/0035071 | A1* | 1/2020 | Anderson | F15B 15/10 |

OTHER PUBLICATIONS

International Search Report and Written Opinion for International Application No. PCT/IB2019/061447, European Patent Office, Netherlands, dated Apr. 6, 2020, 16 pages Maeda, T., et al., "HapticAid: Haptic Experiences System Using Mobile Platform," *TEI '17: Proceedings of the Eleventh International Conference on Tangible, Embedded, and Embodied Interaction*, pp. 397-402, Association for Computing Machinery, United States (Mar. 2017).

Prattichizzo, D., et al., "RemoTouch: A system for remote touch experience," *19th International Symposium in Robot and Human Interactive Communication*, pp. 676-679, Institute of Electrical and Electronics Engineers, United States (Oct. 2010).

* cited by examiner

SENSING DEVICE SUITABLE FOR HAPTIC PERCEPTION APPLICATIONS

TECHNICAL FIELD

The present disclosure concerns detection devices and more particularly a wearable device for detecting tactile sensations.

TECHNOLOGICAL BACKGROUND

Nowadays haptic interfaces, that is those devices that allow to provide tactile sensations to users, are increasingly widespread in robotics and virtual reality applications. These interfaces must be properly controlled to generate the same tactile sensations on the users' skin as they would when touching the surface of an object.

Ring-shaped haptic interfaces are known, such as that described in the Italian patent application 102018000003965 entitled "Haptic ring", wearable by a user and connected via wireless or with wire connection, to systems that provide the signals that control them.

In order to make the reconstruction of tactile sensations realistic, it would be necessary to sample tactile sensations using devices equipped with sensors organized to obtain a set of data which, properly processed, would allow to control haptic interfaces in order to reproduce the same tactile sensation as faithfully as possible.

It would be desirable to make detection devices, equipped with one or more of these sensors, which are easy to make and wearable and which do not hinder the tactile exploration of objects, but which at the same time allow to collect data that together provide an accurate representation of the tactile sensation perceived, so that it can be faithfully reproduced in a haptic interface.

SUMMARY

Among the various sensations produced during tactile exploration of an object, the detection of the vibrations that the touch produces on the user's fingers appears to be particularly critical, for example vibrations due to the impact of the fingers against the object and/or to sliding of fingertips on its rough surface.

To accurately detect these vibrations without hindering tactile exploration, a detection device as defined in claim 1 has been devised. Basically, it comprises: an elastically deformable annular band defining a lower part, configured to remain exposed and to be placed directly contact with an object to be touched with a user's finger, and an upper part configured to remain in an internal compartment of the detection device; a rigid support fixed to the upper part of the band and placed outside it; a microprocessor electronic board fixed to the rigid support and having at least one vibration sensor which senses vibrations transmitted to the electronic board; a rigid body comprising a front cover and a rear cover that can be coupled together to define the internal compartment and at least a rigid curved surface configured to be placed in direct contact with the user's finger, in which the front cover and the rear cover, when coupled between them, enclose in the internal compartment the upper part of the annular band, the electronic board and the rigid support, the latter remaining in contact with an inner face of the rigid body.

The claims as filed are an integral part of this description and are incorporated herein by express reference.

DETAILED DESCRIPTION

Figure 1:
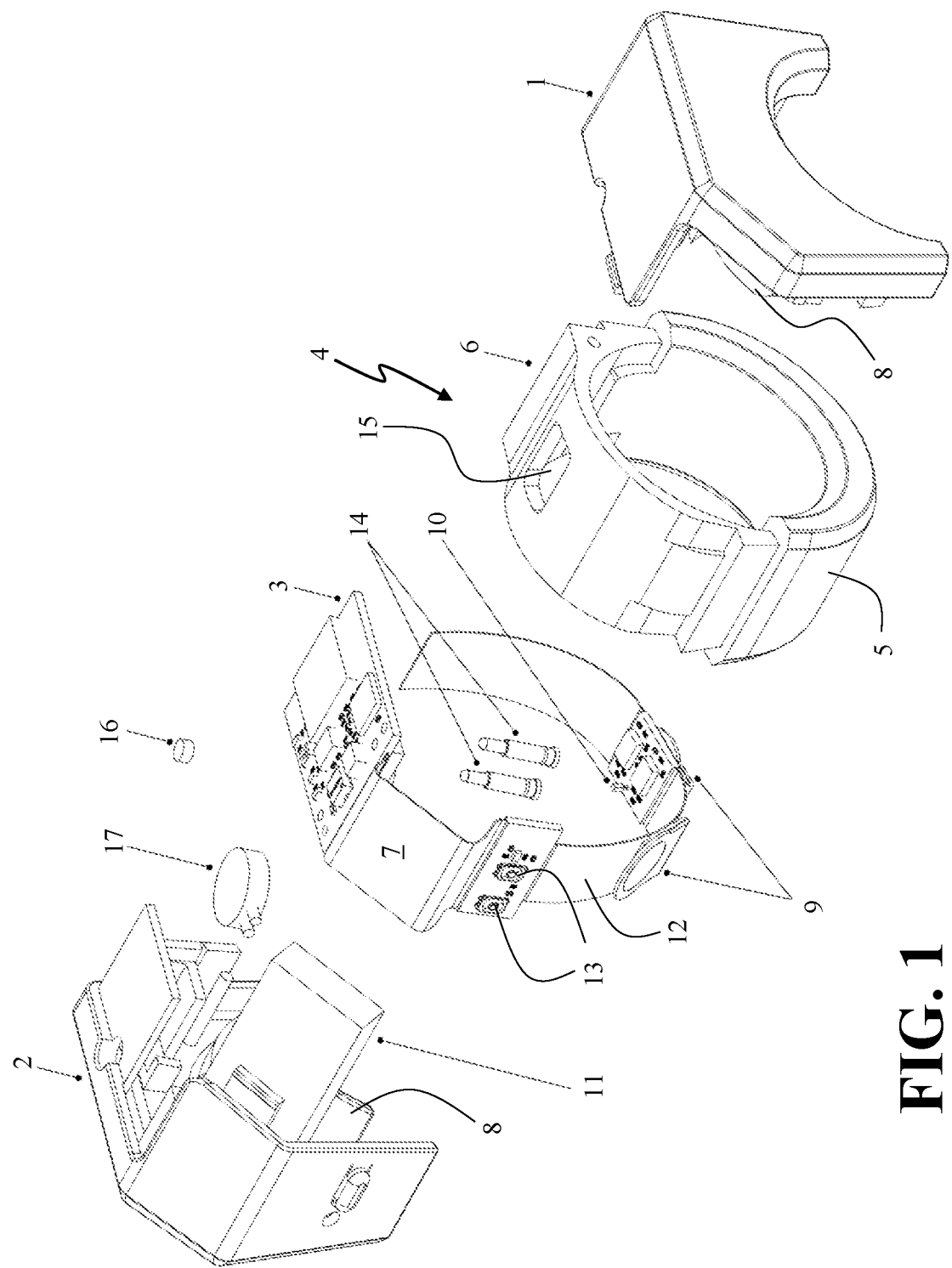
FIG. 1 is an exploded view of a tactile sensing device according to an aspect of the present disclosure.

A tactile sensing device according to an aspect of the present disclosure is illustrated in FIG. 1. It has an annular shape to be preferably worn as a ring, or possibly as a bracelet or even as a thimble, and is configured to record haptic interactions that occur between a hand of the user who wears it and any object or part of the body of a living being that the user of the device can touch. For simplicity of presentation, reference will be made to the illustrated case in which the detection device is a ring that a user can put on a finger of a hand, but what will be said can be repeated mutatis mutandis if the detection device is a bracelet or thimble.

The device shown in FIG. 1 comprises an external body made of rigid material, made as a front cover 1 and a rear cover 2 which snap onto each other. There is also an annular band 4 made of deformable material, for example of silicone, which defines a lower part 5, intended to come into direct contact with an object, and an upper part 6 intended to remain in an internal compartment of the device. The front 1 and rear 2 covers are defined so as to leave the lower part 5 uncovered, which protrudes from the body, and to enclose the upper part 6 when sandwiched.

The detection device has an electronic board 3, arranged so as to remain enclosed between the front 1 and rear 2 covers of the external body together with the upper part 6 of the annular band 4. The electronic board 3 has a microprocessor and is configured to read values detected by one or more sensors of the detection device.

According to one aspect, the described detection device can be used to measure vibrations of the finger that touches the objects, determined by surface properties of the touched object (roughness, texture, etc.). For this purpose, on the electronic board 3 there can be a vibration sensor, for example of a piezoelectric type or based on MEMS technology.

According to a preferred aspect, the vibrations induced on the electronic board 3 are detected by an inertial measurement system (not shown in the figures) based on accelerometer and gyroscope (IMU) so as to also detect the space orientation of the device in addition to vibrations that are transmitted to the device worn by a user when the user slides a fingertip against a rough surface of an object or impacts against it.

Figure 2:
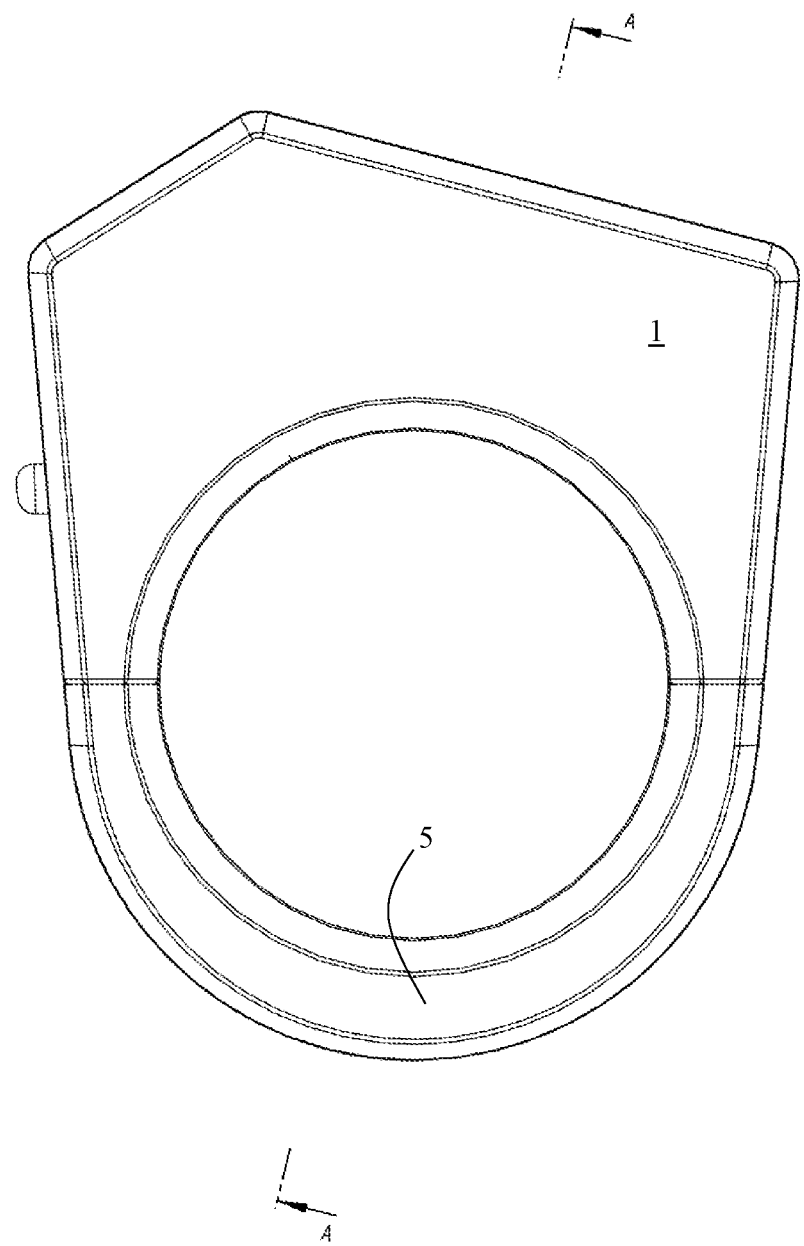
FIG. 2 is a front view of the device of FIG. 1.
Figure 3:
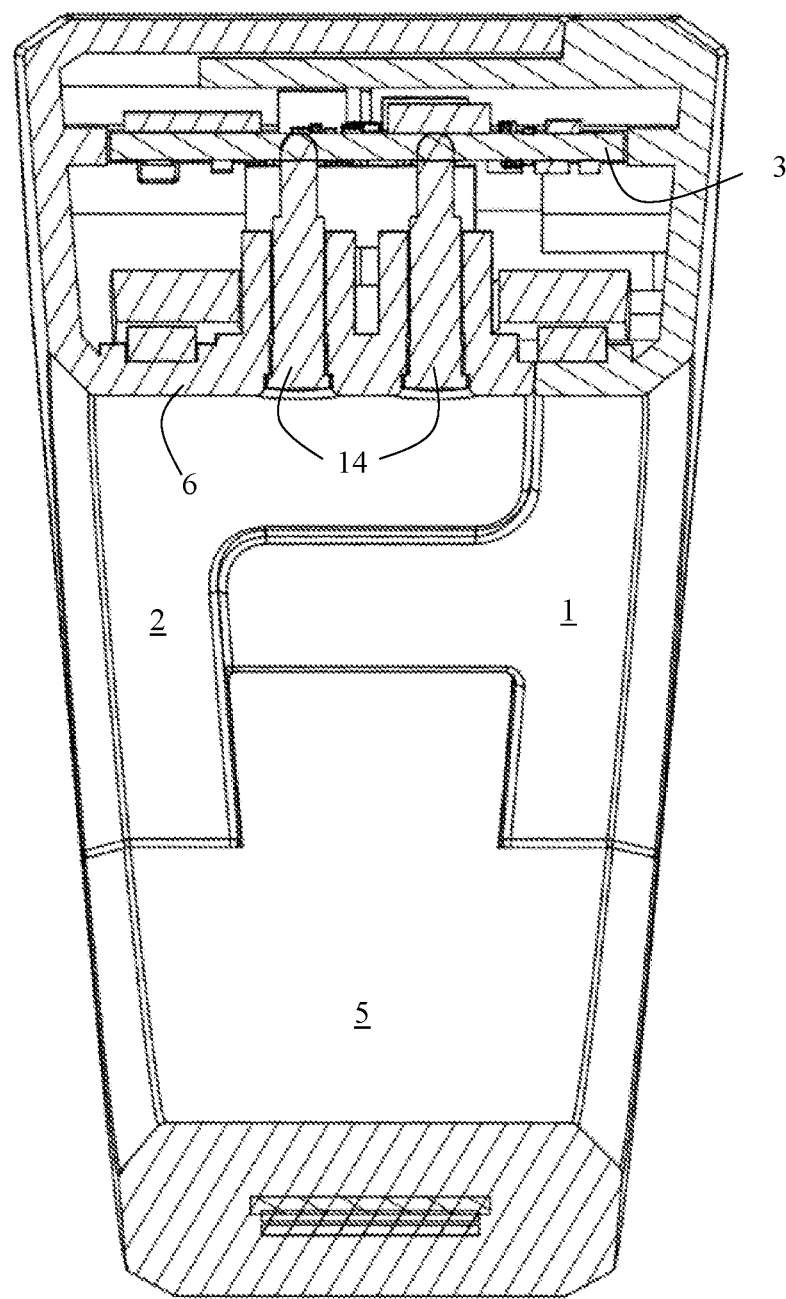
FIG. 3 is a section view along a first plane of the device of FIG. 2.
Figure 4:
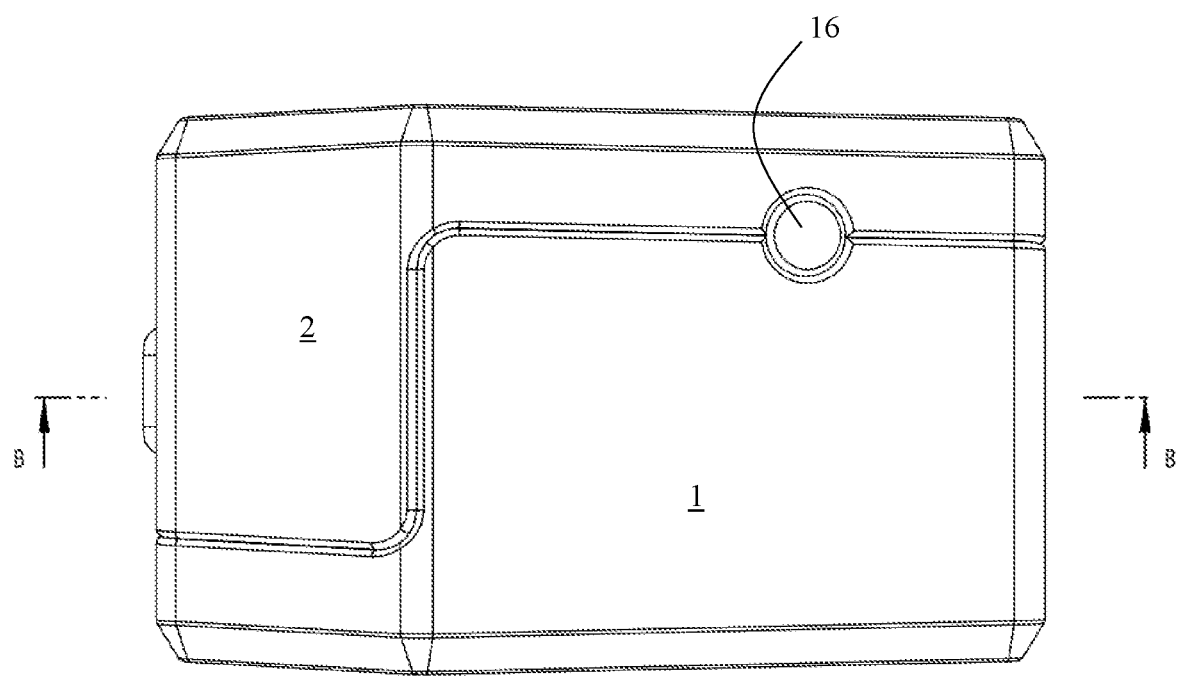
FIG. 4 is a top view of the device of FIG. 1.
Figure 5:
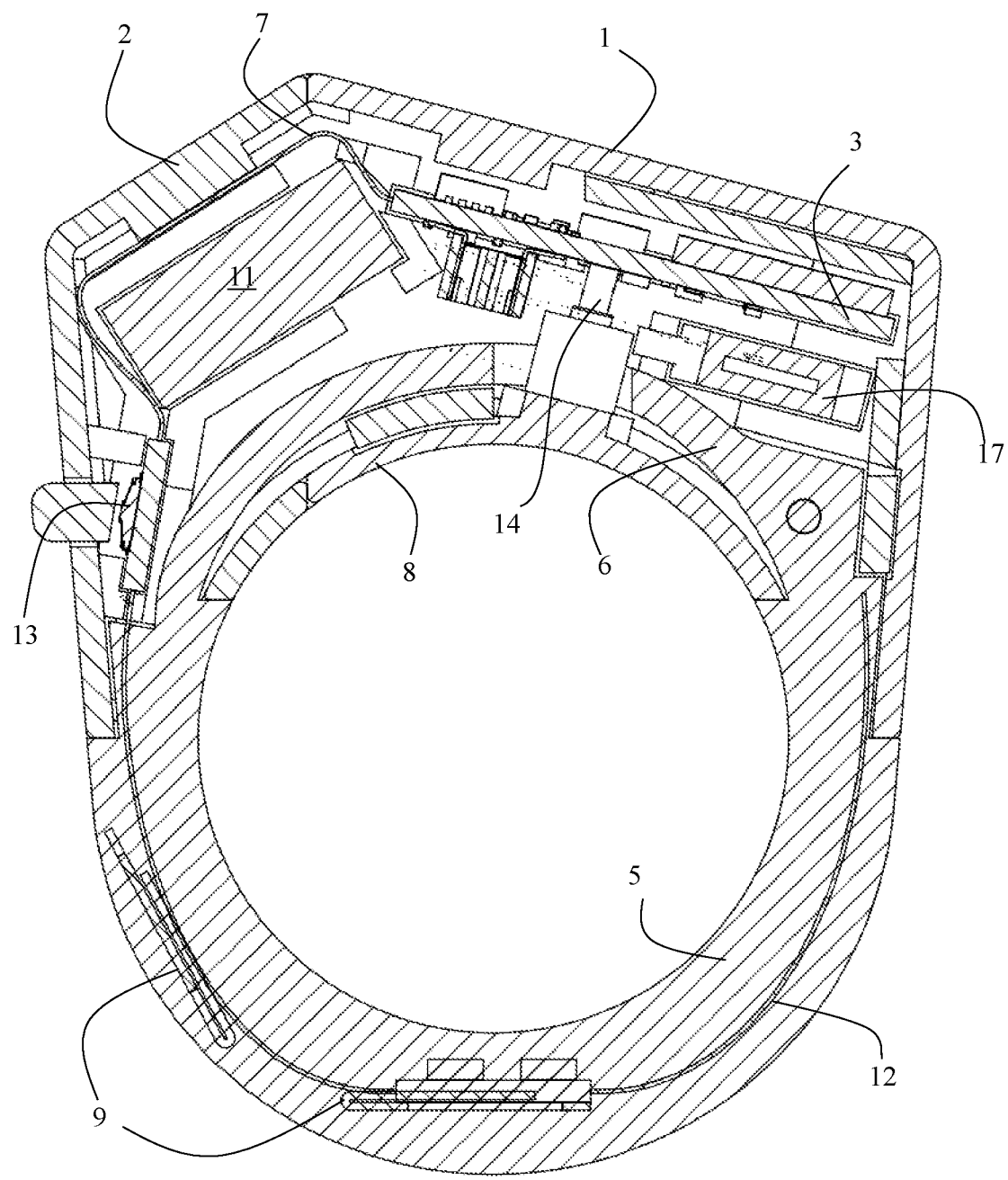
FIG. 5 is a section view along a second plane of the device of FIG. 2.
Figure 6:
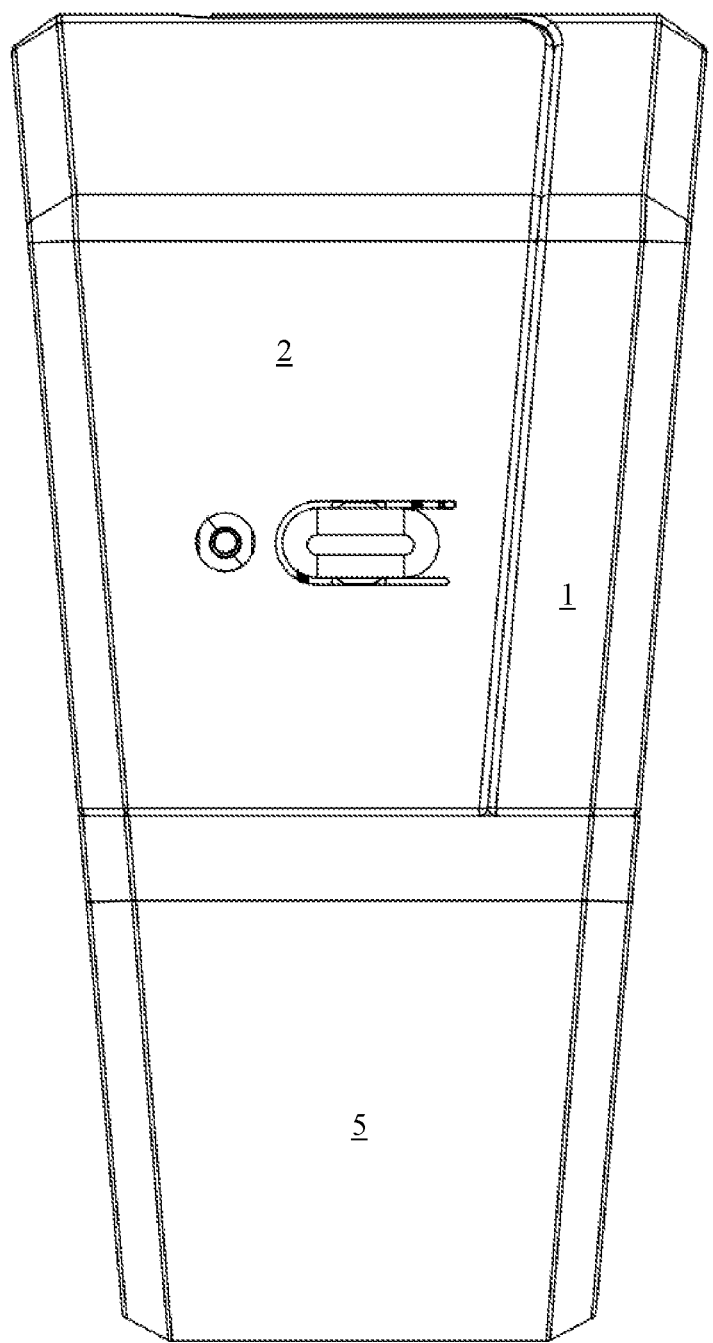
FIG. 6 is a side view of the device of FIG. 1.

As shown more clearly in FIGS. 3 and 5, which are sectional views of the detection device along the planes A-A and B-B indicated in FIGS. 2 and 4, the electronic board 3 emerges from the upper part 6 of the annular band 4 and is supported by a rigid support 7 in direct contact with the external body 1, 2. The external body 1, 2 also defines rigid curved surfaces 8 to enclose the upper part 6 from inside the annular band 4 and to lean directly against the back of a finger. The detection device is therefore structured so that, when the user puts it on the finger, the rigid outer body 1, 2 is in direct contact with the back of the finger, through the rigid curved surfaces 8, and the lower part 5 is in contact with the finger inside the palm of the hand. By sliding the fingertip of the finger wearing the detection device on a rough surface, vibrations occur in the finger which are transmitted to the inertial sensor of the electronic board 3 through the rigid curved surface 8 of the external body 1, 2 and through the rigid support 7. Thanks thus to the structure of the detection device, vibrations of the external body 1, 2 are transmitted practically without attenuation to the electronic board 3 on which the vibration sensor is installed (for example the inertial measurement system) and it becomes possible to detect a tactile sensation due to roughness of a surface even if the detection device is not in direct contact with the object touched by the user.

Since the annular band 4 is made of a deformable material, the detection device will adapt (within certain limits) to the size of the user's finger.

According to one aspect, one or more sensors are embedded in the lower part 5 of the deformable annular band 4, for example force sensors 9 and/or pressure sensors and/or temperature sensors 10, which simultaneously detect data describing the haptic interaction of a user with the objects of the surrounding environment.

According to one aspect, the force sensors 9 are sensors based on resistive technology (Force Sensor Resistor) or capacitive sensors, which vary their electrical properties when subjected to pressure. Consequently, when an user holds an object in the palm of the hand, the lower part 5 made of deformable material is pressed against the object and transmits the effort to the force sensors 9, which detect its intensity. Force sensors 9 based on resistive technology have small dimensions, thus they are easily wearable, and their full scale value is typically in the order of magnitude of the force exerted by the human hand (tens of Newtons).

Other types of sensors (such as for example optical sensors, deformation sensors, sensors that detect biometric parameters, etc.) can be used to estimate the force exerted on the object based on, for example, analysis of blood flow in the arteries of the finger, and/or in monitoring the deformation caused by the tension of the tendon (extensor or flexor) of the finger when the fingertip is pushed against an object (delocalized measure).

According to one aspect, the temperature sensors 10 are embedded in the lower part 5 so as to detect the temperature of an object that the user holds in the palm of the hand. According to one aspect, the temperature sensors 10 are of the NTC (Negative Temperature Coefficient) type and/or semiconductor and/or thermocouples.

As with force, the detection of the temperature of the touched object can also take place locally, i.e. by contact of the sensor with the object, or in a delocalized manner. In the latter case, the temperature of the object can be estimated by means of optical devices sensitive to infrared wavelengths. According to one aspect, the temperature of the touched object can be estimated by monitoring biometric parameters influenced by heat exchange or by means of an image processing system, such as an internal or external camera that interfaces with it.

According to one aspect, the force 9 and temperature sensors 10 are mounted on a strip 12 of flexible material, also embedded in the lower part 5, connected to the rigid support 7 which comes out from the lower part 5 and with electrical connection to the electronic board 3 to allow the microprocessor installed on it to read the values sensed by all the sensors of the detection device.

According to one aspect, not shown in the figures, the force sensors 9 and the temperature sensors 10 are mounted on the same printed circuit connected to the electronic board 3. According to an alternative aspect, the force sensors 9 and/or the temperature sensors 10 are connected to the electronic board 3 by means of wires embedded in the lower part 5 of the annular band 4.

According to one aspect, the electronic board 3 is powered by an internal battery 11 of the device. To match the need of making the detection device compact, aesthetically pleasing and at the same time the need of having a long-lasting battery 11, the rigid support 7 which supports the electronic board 3 can be C-shaped so as to define a housing for the battery 11, which remains longitudinally aligned with the user's finger.

According to one aspect, on the rigid support 7 electric control buttons 13 are mounted to turn on/off the detection device and to carry out predefined control operations.

According to one aspect, the microprocessor electronic board 3 periodically reads the sensors of the device and has an internal memory in which to store the read values.

According to one aspect, the electronic board 3 has a wireless or wired communication interface to transmit the values detected by the sensors to an external processing unit (computer, mobile phone, tablet, etc.) or for simple storage unit (server, cloud etc.).

According to one aspect, to recharge the battery 11, the device can be equipped with connectors 14 of the "Pogo pin" type, fixed to the external body 1, 2 and which contact the recharging pads of the electronic board 3 passing through an opening 15 of the annular band 4. According to an alternative aspect, the device can be configured to recharge the battery 11 with an induction charging system.

According to one aspect, the electronic board 3 can have at least one LED that lights up emitting a light of a predetermined color, visible through a light guide 16, to indicate the operating status of the device and/or the charge of the battery 11.

According to one aspect, the device is equipped with a vibration actuator 17 configured to generate a vibration when it is necessary to report significant events for the user, such as when switching on or off, and/or when the microprocessor electronic board 3 is connected to an App running on an external device to collect the values of the sensors of the detection device read by the microprocessor of the electronic board 3.

According to one aspect, the detection device is configured to activate the temperature sensors 10 only when the user holds an object in the palm of the hand, squeezing the force sensors 9. Thanks to this configuration, consumption can be reduced by putting in stand-by the part of the electronic board 3 intended for reading the temperature sensors 10.

The detection device of this description can be used to capture and collect data that can be displayed, processed, studied or rendered by a haptic interface, such as that described in the application for Italian patent 102018000003965 entitled "Haptic Ring", which is a second device ("acting device") equipped with actuators suitable for reproducing at least a part of the sensations that generated the acquired data.

In particular, tactile sensations that can be acquired are:
the force exerted by the hand or part of the affected hand on the object;
the vibrations of the hand and of part of the affected hand coming from the tactile exploration of the object;
the heat exchange that takes place between the hand or part of the affected hand and the object.

Different implementations of the device can be foreseen and which allow to measure a set of tactile sensations also different from those listed. Consequently, the measuring system can be equipped with a set of sensors different from those mentioned above. For example, embodiments of the device can be provided which measure one or a subset of the tactile sensations listed above or capable of measuring other aspects of the tactile interaction, such as for example the humidity of the touched object.

By wearing multiple detection devices of this disclosure, a user can record the tactile interaction simultaneously from multiple points of his hand.

Possible Applications and Systems Involving the Described Detection Device

The described device can be used to acquire signals that somehow "describe" the tactile interaction that takes place between a user and the surrounding environment. These data can be simply collected to be studied, analyzed, to make statistics, inferences of various kinds, for the construction of a database, or of a dataset for training artificial intelligence systems. However their most interesting use is linked, as mentioned above, to the haptics: they can be used in practice as a "source" of tactile data that provide input data for haptic interfaces of various types, i.e. devices capable of reproducing on the user, who uses them, the registered tactile sensations (as described in the Italian patent 102018000003965 "Haptic Ring").

Depending on the considered application, on the number and type of used acting devices and on the communication channel to be used, the data recorded by the detection device can be suitably processed, combined and possibly compressed by a special software.

Enhanced Multimedia Content Generation with Tactile Information

Figure 7:
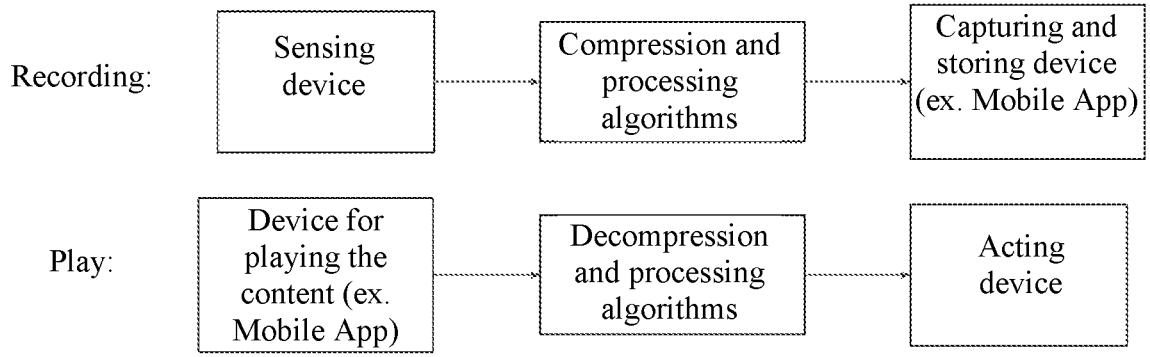
FIG. 7 shows a block diagram for an application for generating augmented multimedia content with tactile information.

The described detection device can be used to generate multimedia contents (which typically contain only audio and/or video information) augmented with a tactile track coming from the described device, as explained in FIG. 7. During the recording of a video that takes place while a user (preferably framed) wears the detection device, the tactile interactions that the user has with the surrounding environment are recorded (together with the audio and video). This creates content enriched with a tactile track that comes from the detection device (which can be seen in this case as a sort of "tactile microphone"). The generated content can now be treated as any video (stored, sent, shared, edited). In a second moment, any user (even the same user who generated the content) can enjoy this multimedia content increased with tactile information using any acting device that will reproduce tactile sensations on his skin, in correspondence of the scenes in to which these feelings have been recorded.

One possible version of this system has been implemented to work with the device acting described in patent 102018000003965 "Haptic Ring", and is described below.

A special mobile app is able to communicate with the described detection device and to acquire the data coming from it during the recording of a video. Video, audio and tactile data are then recorded simultaneously. In a second moment the same application can connect to the acting device and start playing the video. During this reproduction, for each recorded frame, the video information will be sent to the screen, the audio information to the audio channel and the tactile information to the acting device, for a multisensory use of the content.

For this application, given the involved acting device, given the bandwidth of the communication channel and given the need to occupy little memory on the mobile device, ad-hoc algorithms for processing and compression of the signals read by the detection device have been implemented. For example, since the acting device with which the recorded tactile sensations are reproduced contains only one actuator for the rendering of vibrations, the information coming from the inertial system IMU of the detection device has been "condensed" into a single signal with an appropriate algorithm. To improve rendering fidelity, this signal was processed with filtering and compression techniques before being sent to the actuator.

Similarly, as regards to temperature, the response of the used actuator (Peltier cell) in the acting device was considered in order to appropriately sample the signals read by the detection device and to compress the information to be transmitted obtaining savings and greater efficiency in terms of bandwidth and occupied memory.

In some cases the acquired signals can also be "combined" through "sensor fusion" techniques. In the implementation of this application, for example, the data of the inertial system IMU and of the pressure sensors were used to identify, during the recording, the moments of contact between the hand and the objects of the surrounding environment. During all the moments of "non-contact" the data coming from the temperature sensor, for example, are ignored: the temperatures read in those moments would relate to the surrounding environment of the device and not to the actual temperature of the touched objects.

Enhanced Multimedia Content Editing with Tactile Information

Figure 8:
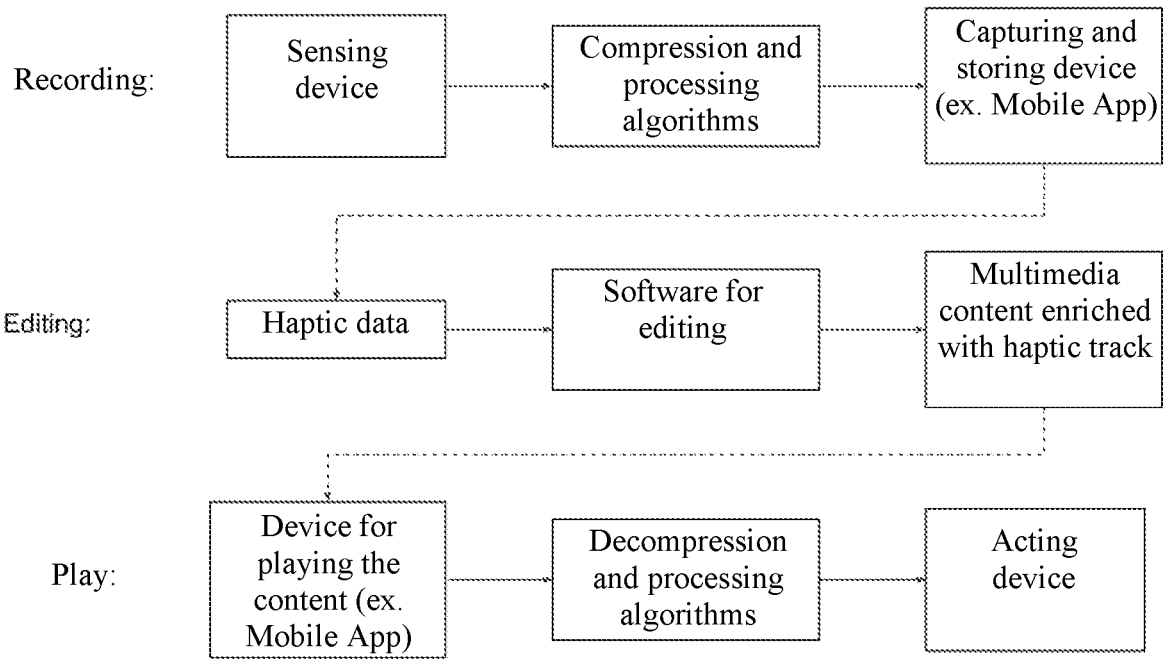
FIG. 8 shows a block diagram for an application for editing augmented multimedia content with tactile information.

A slightly different application from the previous one, schematized in the flow chart of FIG. 8, however, provides for the creation of multimedia contents increased with tactile sensations but with the possibility of adding these sensations at a later time, not during the generation of the multimedia content. If a video (even a movie) or a photo is to be enriched with tactile content, the data collected by the detection device can be added to that multimedia content by means of special editing software. In the case of photos, a recording can be started using the detection device that generates a tactile sequence that will be associated with the photo, for example for sending, sharing or simply storing. The photo thus enriched can be shared with another user or can be put online, for example on an e-commerce site where a product can be viewed (from the photo) and virtually "touched" thanks to the associated tactile content. For example, it is possible to record the texture of the fabric of a dress for sale and associate it with the photo of the dress itself, for a multi-sensory e-commerce experience.

In the case of videos, it is possible to "place" one or more tactile sensations along a timeline of the video in a special tactile track (superimposed on the audio and video ones), in correspondence with particular frames, as in a sort of "tactile dubbing". As in the first case, the contents thus created can be used in their tactile component through any acting device.

Sharing Only the Tactile Content

Another possible use of the detection device is represented by the simple possibility of sharing with another user a tactile sequence recorded as in the previous case, but considered alone, not designed to enrich another multimedia content. For example, this recorded sequence can be used as a "tactile note", similar to the audio notes transmitted via Whatsapp or similar.

Creation and Storage of Tactile Content for VR/AR Applications

Nowadays most of the haptic interfaces ("acting devices") on the market are designed to be used in virtual and augmented reality applications: a user who interacts with virtual objects, wearing such devices, can have the sensation of "touching them". To do this, the creator of virtual content must also associate tactile content with the virtual objects he creates from a graphic point of view. Properties such as hardness, roughness, temperature etc . . . , will determine the tactile sensations perceived by the user when he interacts with virtual objects.

Figure 9:
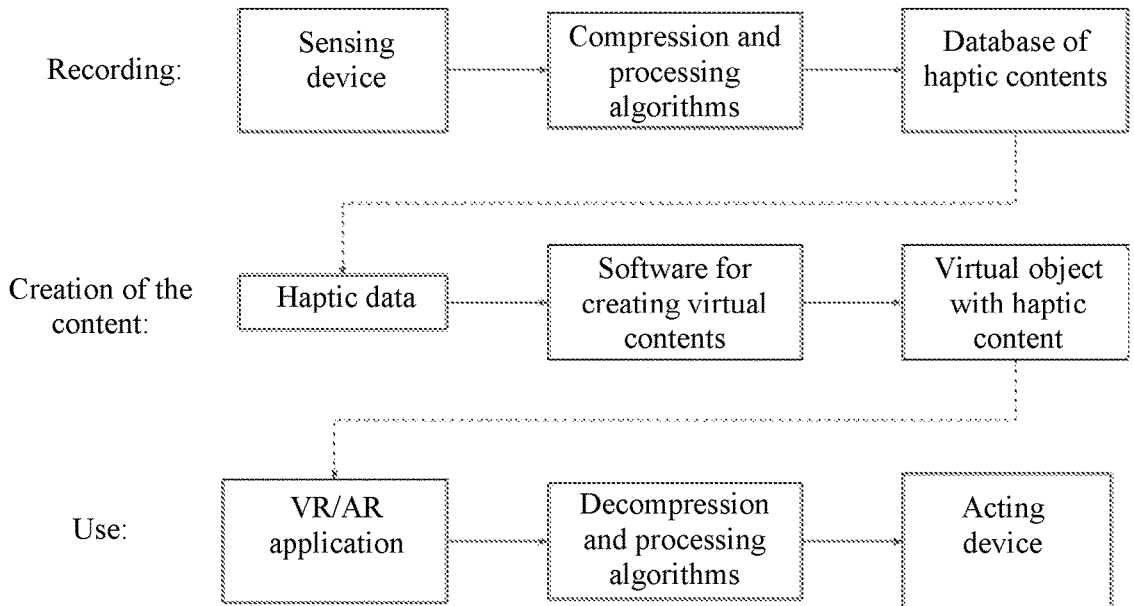
FIG. 9 is a block diagram for creating and storing tactile contents for VR/AR applications.

The detection device presented in this description represents an immediate use tool for the creation of these tactile contents, implementing the block diagram in FIG. 9. For example, suppose that the creator wants to associate a certain material with a particular virtual object (e.g. wood). Without the detection device, the content creator should "create" a certain virtual texture that gives the user the sensation of touching a wooden object. Thanks to the detection device of this disclosure, this process can be simplified considerably: the content creator will only have to touch and record a few seconds of tactile interaction with any real wooden object and then associate the recorded tactile content with the virtual object he is creating. It will therefore also be possible to create a database of these tactile sensations that contains various types of material that can be downloaded from the web if necessary by all developers and content creators. The haptic information associated in this way with a certain virtual object will then be reworked to be rendered on the acting device taking into account also (in real time) the movements and the tactile exploration mode of the user who interacts with the virtual object.

This concept applies to all the tactile sensations that can be recorded by the detection device, not only to the vibrations that determine the surface properties of a certain object.

Real-Time Transmission of Tactile Sensations

Figure 10:
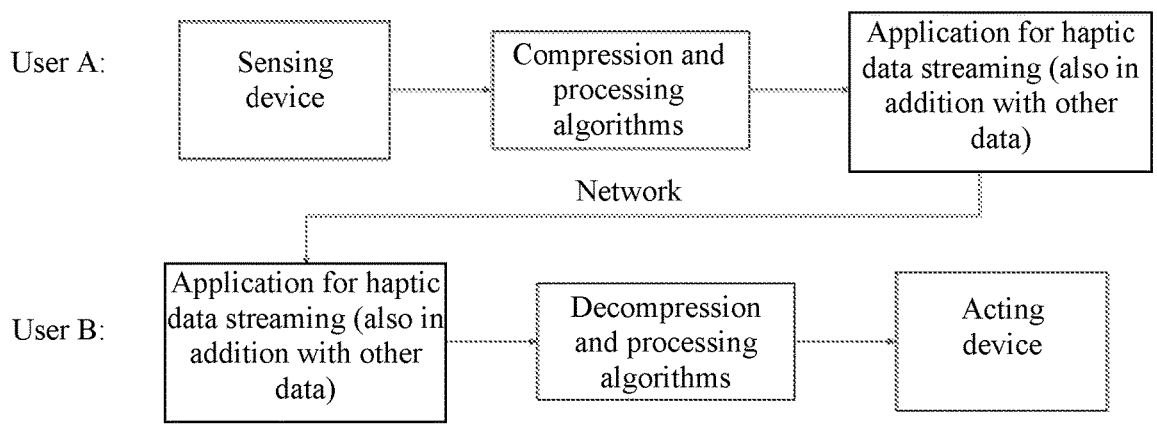
FIG. 10 is a block diagram for real-time transmission of tactile sensations.

In an application, two users ("user A" and "user B") are connected to each other through a physical connection, a local network or the internet, which connects two devices, one for detection and one for acting, worn simultaneously and respectively of user A and user B. As schematized in the diagram of FIG. 10, user A who wears the detection device can interact tactfully with objects that surround him and send in real-time the tactile information acquired directly to the device of acting worn by user B, to make him feel the same tactile sensations. User B will therefore have the sensation of interacting with the same objects touched by user A. An example of this application is a videochat increased with a sense of touch. In this case the two devices are physically connected to two computers (or mobile devices) used by the two users who in the meantime also capture and send audio and video information.

The invention claimed is:

1. A tactile sensing device, comprising:
an elastically deformable annular band wearable as a ring on a user's finger, defining a lower part of the annular band configured to remain exposed and to be placed in direct contact with an object to be touched and with a user's finger, and an upper part of the annular band configured to remain in an inner compartment of the tactile sensing device, wherein the lower part of the annular band and the upper part of the annular band are integral to each other,
a rigid support distinct from said elastically deformable annular band, wherein said rigid support is fixed over said upper part and placed outside said elastically deformable annular band; an electronic board fixed to said rigid support, having at last one vibration sensor and a microprocessor functionally configured to receive electrical signals generated by said at last one vibration sensor corresponding to vibrations transmitted on the electronic board;
a rigid body comprising a rigid front cover and a rear cover distinct and separated from said rigid support and from said elastically deformable annular band, wherein said rigid front cover and said rigid rear cover are coupled together to define said inner compartment and at last one rigid curved surface configured to come into direct contact with said finger of the user, said front cover and said rear cover being configured to enclose in the inner compartment, when coupled together, the upper part of the annular band the electronic board and said rigid support, wherein said rigid support remains in contact with an inner face of the rigid body.

2. The sensing device according to claim 1, wherein said vibration sensor is either an inertial measurement system or a piezoelectric sensor.

3. The sensing device according to claim 1, comprising at least one force or pressure sensor embedded in the lower part of the annular band, said at least one force or pressure sensor being configured for detecting a force with which an object is pressed against said lower part of the annular band.

4. The sensing device according to claim 3, wherein said at least one force sensor is a resistive force sensor.

5. The sensing device according to claim 1, comprising at least one temperature sensor embedded in the lower part of the annular band, said at least one temperature sensor being configured to detect a temperature of an object in contact with said lower part of the annular band.

6. The sensing device according to claim 3, comprising a flexible strip embedded in the lower part of the annular band, on said flexible strip being installed said at least one force or pressure and/or temperature sensor and related electrical connections to said electronic board to be read by the microprocessor.

7. The sensing device according to claim 1, wherein said rigid support is C-shaped so as to define a housing for a battery, said housing being longitudinally aligned with a finger of a user when the device is worn on said finger.

8. The sensing device according to claim 1, comprising a vibration actuator functionally connected to said electronic board and configured to vibrate said rigid body when it receives a corresponding command from the microprocessor.

9. The sensing device according to claim 1, wherein said electronic board comprises a wireless or wired communication interface, configured to transmit values detected by at least one sensor of the detection device to an external unit.

10. The sensing device according to claim 1, configured to be worn as a ring on a user's finger, with said lower part of the deformable band in contact with the skin of the finger on the palm side, and with said rigid curve surface of the rigid body in direct contact with the back of the finger.

\* \* \* \* \*